(12) United States Patent
Chandra et al.

(10) Patent No.: US 8,689,180 B2
(45) Date of Patent: Apr. 1, 2014

(54) SYSTEMS AND METHODS FOR RESOURCE LEAK DETECTION

(75) Inventors: Satish Chandra, Yorktown Heights, NY (US); Emina Torlak, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 12/611,561

(22) Filed: Nov. 3, 2009

(65) Prior Publication Data

US 2011/0107297 A1    May 5, 2011

(51) Int. Cl.
*G06F 9/44* (2006.01)
*G06F 9/00* (2006.01)
*G06F 11/00* (2006.01)

(52) U.S. Cl.
USPC ........... 717/110; 717/124; 717/127; 717/128; 717/131; 712/227; 714/799

(58) Field of Classification Search
None
See application file for complete search history.

(56) References Cited

U.S. PATENT DOCUMENTS

| | | | | |
|---|---|---|---|---|
| 5,842,019 | A * | 11/1998 | Kolawa et al. | 717/130 |
| 6,079,031 | A * | 6/2000 | Haley et al. | 714/38.1 |
| 6,154,876 | A * | 11/2000 | Haley et al. | 717/133 |
| 6,560,773 | B1 * | 5/2003 | Alexander et al. | 717/128 |
| 6,658,652 | B1 * | 12/2003 | Alexander et al. | 717/128 |
| 7,559,063 | B2 * | 7/2009 | Kass | 718/108 |
| 7,774,741 | B2 * | 8/2010 | Sridharan et al. | 717/100 |
| 8,060,869 | B1 * | 11/2011 | Panchenko et al. | 717/158 |
| 2004/0117540 | A1 * | 6/2004 | Hahn et al. | 711/100 |
| 2005/0091646 | A1 * | 4/2005 | Chilimbi et al. | 717/130 |
| 2005/0182788 | A1 * | 8/2005 | Arndt et al. | 707/103 R |
| 2005/0262233 | A1 * | 11/2005 | Alon et al. | 709/223 |
| 2006/0206885 | A1 | 9/2006 | Seidman et al. | |
| 2007/0271418 | A1 | 11/2007 | Sridharan et al. | |
| 2008/0178189 | A1 * | 7/2008 | Findeisen et al. | 718/104 |
| 2008/0301646 | A1 * | 12/2008 | Gupta | 717/127 |
| 2009/0037885 | A1 * | 2/2009 | Edwards et al. | 717/128 |
| 2009/0281999 | A1 * | 11/2009 | Sinha | 707/3 |
| 2010/0115494 | A1 * | 5/2010 | Gorton, Jr. | 717/128 |
| 2010/0199264 | A1 * | 8/2010 | Maeda | 717/127 |

OTHER PUBLICATIONS

Guyer, S., et al. "Free-Me: A Static Analysis for Automatic Individual Object Reclamation." PLDI'06. Proceedings of the ACM SIGPLAN 2006 Conference on Programming Language Design and Implementation. Jun. 2006. pp. 364-375.

Heine, D., et al. "A Practical Flow-Sensitive and Context-Sensitive C and C++ Memory Leak Detector," PLDI'03, In Proceedings of the ACM SIGPLAN 2003 Conference on Programming Language Design and Implementation. Jun. 2003. pp. 168-181.

Weimer, W., et al. "Finding and Preventing Run-Time Error Handling Mistakes." OOPSLA'04. Session: Verification and validation. Oct. 2004. Volume 39, Issue 10. pp. 419-431.

* cited by examiner

*Primary Examiner* — Michael Sun
(74) *Attorney, Agent, or Firm* — Tutunjian & Bitetto, P.C.; Louis Percello

(57) ABSTRACT

Systems and methods for detecting resource leaks in a program using static analysis are disclosed. Dynamically adjustable sets of must-access paths can be employed for aliasing purposes to track resources intra- and inter-procedurally through a program. Actionable reports are also disclosed, in which resource leaks are prioritized, filtered and clustered to improve utility.

17 Claims, 5 Drawing Sheets

SYSTEMS AND METHODS FOR RESOURCE LEAK DETECTION

BACKGROUND

1. Technical Field

The present invention relates to resource leak detection, and more particularly to methods and systems employing static analysis to track system resources and detect and report resource leaks.

2. Description of the Related Art

Resource leaks typically arise from programming errors in which a finite system resource, such as input/output (I/O) streams, fonts and database connections, is never released by the corresponding program. As a result, system speed can degrade and system crashes may occur. Although garbage collection relieves programmers from the burden of managing memory explicitly, programmers still explicitly manage other finite system resources. Resource leak detection tools assist programmers in detecting resource leaks by analyzing program code and reporting resources leaks to permit efficient identification and correction of leak sources.

SUMMARY

Exemplary embodiments of the present invention are directed to systems and methods for tracking resources through a program to determine whether the program leaks any resources. In particular, efficient tracking procedures disclosed herein employ dynamically adjustable sets of must-access paths for aliasing purposes while analyzing a program.

In one exemplary embodiment of the present invention a method for detecting resource leaks in a program includes: initiating analysis of a control flow of the program; generating an initial set of must-access paths for a resource in response to acquisition of the resource in the control flow; tracking the resource in the control flow by dynamically modifying the set of must-access paths by, at least one of, adding or removing must-access paths in accordance with the control flow analysis; and determining that the resource is leaked if the resource is unreachable at an exit in the control flow based on the set of must-access paths.

In another exemplary embodiment of the present invention, a system for detecting resource leaks in a program includes: a control flow representation generator configured to generate a control flow representation of the program; a must-access path module configured to store a plurality of sets of must-access paths; a tracker configured to analyze the control flow and track a resource by generating and modifying the sets of must-access paths such that a given set of must-access paths for a resource is generated in response to acquisition of the resource in the control flow and such that the given set of must-access paths are dynamically modified by, at least one of, adding or removing must-access paths in accordance with the control flow analysis to track the resource; and a reporting module configured to report the resources as leaked if the resource is determined to be unreachable at an exit in the control flow based on the set of must-access paths.

Further, in an alternative embodiment of the present invention, a method for reporting resource leaks in a program includes: generating a control flow representation of the program; analyzing the control flow representation to determine resource leaks; determining whether the resource leaks are witnessed leaks or potential leaks that are due to analysis limitations; and reporting the resource leaks such that the witnessed leaks are prioritized over potential leaks that are due to analysis limitations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
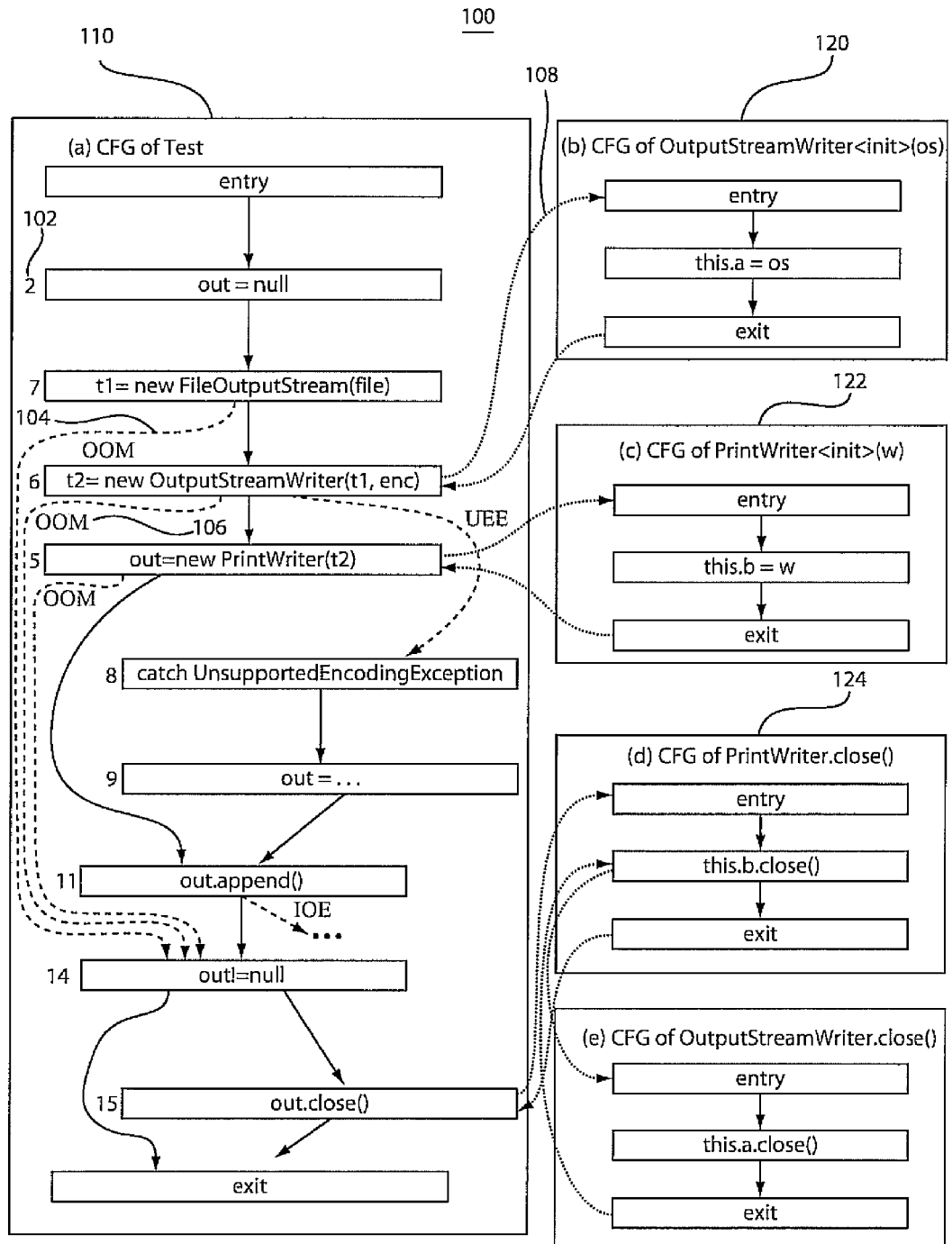
FIG. 1 is a high-level block/flow diagram of a control-flow graph illustrating aspects of an analysis in accordance with an exemplary embodiment of the present invention.

In accordance with exemplary embodiments of the present invention, static analysis can be performed to report resource leak bugs in programs, such as Java programs. The exemplary embodiments described herein can be industrial-strength tools that are usable in an interactive setting in that they can work on millions of lines of code in a matter of minutes and, at the same time, have very low false positive rates. In particular, open-source applications can be analyzed statically to detect defects on an entire program, as opposed to a limited scope of a single procedure. The exemplary embodiments described herein are fast enough to analyze large programs, such as Java programs with 10,000 classes.

While garbage collection frees a programmer from the responsibility of memory management, it does not address the problem of resource management. In Java, and similar languages, when a program acquires an instance of a finite system resource, such as a socket or a database connection, it must release that instance by explicitly calling a dispose or close method. Letting the last handle to an unreleased resource go out of scope leaks the resource: the runtime system slowly depletes the finite supply of system resources, leading to performance degradation and system crashes. Ensuring that resources are always released, however, is tricky and error-prone.

As an example, consider the Java program illustrated in Table 1, below.

TABLE 1

| | |
|---|---|
| 1 | public void test(File file, String enc) throws IOException { |
| 2 |     PrintWriter out = null; |
| 3 |     try { |
| 4 |         try { |
| 5 |             out = new PrintWriter( |
| 6 |                 new OutputStreamWriter( |
| 7 |                     new FileOutputStream(file), enc)); |
| 8 |         } catch (UnsupportedEncodingException ue) { |
| 9 |             out = new PrintWriter(new FileWriter(file)); |
| 10 |         } |

TABLE 1-continued

```
11              out.append('c');
12         }catch (IOException e) {
13         }finally {
14            if (out != null) {
15               out.close( );
16            }
17         }
18     }
```

The allocation of a FileOutputStream at line 7 acquires a stream, which is a system resource that needs to be released by calling close( ) on the stream handle. The acquired stream object then passes into the constructor of OutputStreamWriter, which remembers it in a private field. The OutputStreamWriter object, in turn, passes into the constructor of PrintWriter. In the finally block, the programmer calls close( ) on the PrintWriter object. This close( )method calls close( ) on the "nested" OutputStreamWriter object, which in turn calls close( ) on the nested FileOutputStream object. By using filially, it would appear that program closes the stream, even in the event of an exception.

However, a potential resource leak lurks in this program. The constructor of OutputStreamWriter might throw an exception: notice that the programmer anticipates the possibility that an UnsupportedEncodingException may occur. If it does, the assignment to the variable out on line 5 will not execute, and consequently the stream allocated on line 7 is never closed.

Resource management bugs are common in Java code for a number of reasons. First, a programmer might omit a call to close( ) due to confusion over the role of the garbage collector. Second, even a careful programmer can easily fail to release all resources along all possible exceptional paths, as illustrated in Table 1. Finally, a programmer needs to understand all relevant API contracts. In the example above, the programmer correctly reasoned that closing the PrintWriter instance closes the nested resources through cascading close( ) calls. However, cascading close is not universal across all APIs, and a programmer could easily make incorrect assumptions.

Exemplary implementations of the present invention include static-analysis-based resource leak detection tools that are scalable and useful. They are useful in the sense that the reports produced by the tools are actionable by a user, as opposed to merely being comprehensive. Further, they are scalable in that the implementations can handle real-world Java applications comprising tens of thousands of classes.

Exemplary features of the present invention include the performance of scalable inter-procedural analysis. Inter-procedural reasoning about aliases is one factor in building a useful resource leak detection tool. For example, in the program illustrated in FIG. 1, exemplary embodiments of the present invention can reason that the instance of FileOutputStream released in OutputStreamWriter's close( )method is in fact the same instance that was attached to the OutputStreamWriter object when the latter was constructed. Such reasoning can be difficult to implement when analyzing applications with tens of thousands of classes, as programs of this size preclude computation of a precise enough whole-program alias analysis. Embodiments of the present invention can side-step the general alias analysis problem by tracking pertinent aliasing information using access paths in the context of an efficient inter-procedural data-flow analysis. Surprisingly, it was empirically observed that sparse tracked aliasing information can accord high precision.

Other exemplary features address the problems of false positives. False positives generally occur in any tool that guarantees soundness. However, if a bug-finding tool produces too many false positives, a user would simply tend to ignore the results. A bug-finding tool as opposed to a verification tool, whose goal is to determine whether or not the code is free of a certain class of errors, should prioritize reports that are likelier than others to be true positives. Exemplary embodiments can offer such prioritization by keeping a record of whether a bug was witnessed along some path, or whether it was assumed due to the limitations of the analysis. It can be shown, empirically, that bugs arising from analysis limitations are much more likely to be false positives.

Exemplary embodiments may also address issues that are pertinent to the problem of resource management. For example, with respect to nested resources, it is insufficient to track just the basic system resources because the corrective action that a user should take may be to call a close method on an object that nests a resource instance. For example, suppose that in the program illustrated in Table 1, the constructor of OutputStreamWriter could not throw an exception, but instead, the programmer forgot to include out.close( ) Even though the real resource is FileOutputStream and not OutputStreamWriter or PrintWriter, in this case, programmers would normally prefer a report that indicates out should be closed rather than the nameless instance of FileOutputStream. As discussed herein below, exemplary embodiments of the present invention offer reports that make proper remedial action more apparent.

Other aspects that exemplary embodiments of the present invention consider are exceptional flows. For example, as shown in the program provided in Table 1, programmers often make mistakes in using try-catch-finally blocks. Thus, resource leakage tools should pay special attention to bugs lurking there. Reporting leaks due to all possible runtime errors would overwhelm the user with uninteresting results. However, those exception paths that the programmer expects to occur should be addressed. For example, a programmer would typically ignore a leak report based on an OutOfMemoryException, as most programs are not expected to deal with such catastrophic exceptions. Instead, a belief-based heuristic may be employed to suppress reports due to exceptional flow unless the analysis finds plausible evidence to justify the report.

An exemplary control flow graph 100, provided in FIG. 1, for the program shown in Table 1 is now referenced to generally illustrate on a high level how exemplary systems and methods may analyze the program shown in Table 1. In control flow graph 100, line numbers 102 correspond to the line numbers of the program provided in Table 1, dashed edges 104 represent exceptional flow and are labeled with labels 106 indicating the type of exceptions they carry, and dotted edges 108 represent inter-procedural control flow transfers. It should be noted that OOM corresponds to an out of memory exception, UEE corresponds to an unsupported encoding exception and TOE corresponds to an input/output exception.

In exemplary method and system embodiments of the present invention, the analysis can take as input a control-flow graph (CFG) and a specification of procedures that acquire and release system resources. FIG. 1 shows the relevant parts 110 of the CFG for the program of Table 1 along with CFGs 120-126 of some of the called methods. Temporary variables t1 and t2 are introduced when constructing the CFG 110. The example's specification declares that the constructor for FileOutputStream allocates a resource, and the corresponding close( ) releases it.

The goal of this particular analysis is to establish that the allocation of a resource on line 7 is followed by its release on all possible execution paths to exit; when this property does not hold, there is a potential leak. Method and system embodiments can symbolically track each resource through paths in the CFG until either a) it is released, or b) it becomes unreachable without being released, and thus leaks. Consider the program path 7-6-5-11-14-15, starting with the resource allocation on line 7. The next two lines involve inter-procedural tracking due to constructor calls. The constructor on line 6 stores its argument into an instance field a. The analysis can conclude that after line 6, both expressions t2.a and t1 point to the tracked resource. The constructor on line 5 stores its argument into an instance field b. The analysis, likewise, can conclude that after line 5, the expression out.b.a also refers to the tracked resource.

The call out.ciose( ) on line 15 transitively calls close( ) on expressions out.b and out.b.a (note that this in CFGs 124 and 126 would be bound appropriately), the last one releasing the tracked resource, as it is equal to t1. At this point, the resource referred to by the expressions t1, t2.a, and out.b.a is released, and is therefore no longer tracked.

To be effective, method and system embodiments are able to prove that this.a in CFG 126 is equal to t1 assigned in CFG 110. This involves precise inter-procedural must-alias reasoning. Exemplary method and system embodiments perform must-alias reasoning very efficiently using selective equality predicates, without relying on whole-program alias analysis.

With reference now to the exceptional path 7-6-8-9-11-14-15-exit, at line 15, the expression out refers to the object allocated on line 9, and is not equal to t1, the resource allocated on line 7. At the exit of the procedure, the expression t1 still points to the unreleased resource from line 7, and no other expressions may point to that resource. Since t1 goes out of scope at the procedure exit, it can be concluded that the resource allocated on line 7 is unreachable, unreleased, and leaks.

With regard to the path 7-6-5-11-14-exit, where the branch on line 14 is not taken, if the analysis can prove that the false outcome is not possible, the path is infeasible; if the analysis cannot, it reports a leak. Exemplary method and system embodiments can avoid this false positive. For the path 7-6-14-exit, in which an OutOfMemoryException occurs on line 6, the resource can leak along that path. However, at the user's discretion, method and system embodiments can suppress problems along exceptional flows associated with infrequent catastrophic exceptions, as discussed in further detail below.

With reference now to Algorithm 1 of Table 2, provided below, a specific analytic process in accordance with exemplary embodiments of the present invention is illustrated. It should be noted that exemplary embodiments described herein can be implemented in a variety of ways. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Intra-procedural Analysis

Returning to Algorithm 1 of Table 2, as indicated above, a significant degree of efficiency can be achieved by the process in at least two ways. Firstly, as opposed to pre-computing aliases for the entire program or resorting to using imprecise aliasing information, both of which can yield a large amount of false positives, the analysis can generate and use a minimal set of aliasing information on-the-fly while analyzing a program in a way that is completely adequate. Secondly, as opposed to tracking a resource throughout an entire program, the resource can be tracked only in the relevant portions of the program. For example, a resource may be tracked between the location in which it is acquired and the location in which it is released or becomes unreachable.

TABLE 2

```
1    type Fact: SSAVariable × ResourceType × State
2    var D: Statement → 2^Fact
3    for s ∈ Statement do
4        D(s) ← ∅
5    for s ∈ Statement do
6        if s is p = acquire R
7            a = initial State(p)
8            ∀t ∈ succ(s) : D(t) ← D(t) ∪ { ⟨p,R,a⟩ }
9    while changes in D do
10       s ← pick from Statement
11       ⟨p,R,a⟩ ← pick from D(s)
12       case s is release R q
13           if ¬isMustAlias(p, q, a)
14               ∀t ∈ succ(s) : D(t) ← D(t) ∪ { ⟨p,R,a⟩ }
15       case s is branch c L
16           if isConsistent (c, a)
17               u = trueSucc(s) : D(u) ← D(u) ∪ { ⟨p,R,a⟩ }
18           if isConsistent (¬c, a)
19               u = falseSucc(s) : D(u) ← D(u) ∪ { ⟨p,R,a⟩ }
20       case s is exit
21           if isUnreachable (a, p)
22               report p as leaking
23       other
24           a' ← ...
25           ∀t ∈ succ(s) : D(t) ← D(t) ∪ { ⟨p,R,a'⟩ }
```

A control-flow graph can be described with the following kind of abstract statements: entry, exit, p=acquire R, release R q, branch c L, p=new T, p=q.f, p.f=q, p=q, and a call statement invoke. For clarity, it can be assumed method calls that allocate and release statements have been rewritten abstractly as acquire and release statements. For example, p=new FileOutputStream(file) is represented as:

p=acquire FileOutputStream invoke p.<init>( )

In addition, a statement p.close( ) is represented as:

release FileOutputStream p invoke p.close( )

The analysis assumes that each local variable, for example, p, has a single static assignment (SSA). The abstract p=q statement is included to describe the treatment of ϕ-nodes introduced in SSA conversion, as well as to model transmission of values from actual to formals in a procedure call. The branch statement, branch c L, has a conditional expression c and a jump target L. It should be noted that because SSA variables as used here are only unique within a single procedure, caller value numbers should be protected from getting mixed up with callee value numbers.

Generic Data-Flow Analysis

As illustrated in Table 2, algorithm 1 performs iterative data-flow over a powerset lattice of facts of the kind Fact as indicated on line of the algorithm: a 3-tuple that comprises an SSAVariable, which is an SSA value number, ResourceType, which is the kind of the resource, and a State. State represents a finite amount of auxiliary information included in Fact to help resolve queries the algorithm will make. A concrete description of State is given below, but at the moment it may be assumed that it includes predicates over local variables.

The algorithm makes use of the following auxiliary functions:

initialState (p: SSAVariable)–initialState (p; SSAVariable) creates an element of State based on the given SSA variable.

isMustAlias (p: SSAVariable, q: SSAVariable, a: State)– This function means that, given the information in a, p equals q. If this check fails, the analysis does not assume that the variable on which release is called strongly closes a resource referred by p. A conservative answer to this query is false.

isConsistent (condition: Expression, a: State). In accordance with this function, a condition, which is a conditional expression (Expression), does not contradict the information in a. This function is used to prune infeasible paths. A conservative answer to this query is true.

isUnreachable (a: State, p: SSAVariable). This function means that the resource referred by p may no longer be accessible by any live name, as per information in a. At the exit of a procedure, local variables are assumed to become dead, unless otherwise preserved in a. A conservative answer to this query is true.

As shown in Algorithm 1 of Table 2, lines 5-8 seed the analysis with initial facts that correspond to resource allocation. The algorithm then propagates these facts through program statements, creating new facts along the way. Lines 24-25 show the effect on State by other pointer statements, such as p.f=q; these effects are described in more detail below. The algorithm converges because no fact is deleted from the map D and because each component of Fact is finite.

State Description

Exemplary embodiments of the present invention can implement State as a set of must-access-paths to a tracked resource. A must-access-path is an expression comprised of a variable followed by a (possibly empty) sequence of field names, such that the value of the expression refers to the resource. For example, out.b.a, mentioned above, is a must-access-path. Table 3, provide below, illustrates how a set of must-access-paths, named in, is transformed by individual program statements.

TABLE 3

| Statement | out = filter((in − kill) ∪ gen) |
|---|---|
| p = q.f | gen = {p.π \| q.f.π ∈ in} |
| | kill = startsWith (p, in) |
| p.f = q | gen = {p.f.π \| q.π ∈ in} |
| | kill = startsWith (p.f, in) ∪ aliasMatches (p.f, in) |
| p = new T | kill = startsWith (p, in) |
| p = acquire R | kill = startsWith (p, in) |
| p = q | gen = {p.π \| q.π ∈ in} |
| | kill = startsWith (p.f, in) |
| startsWith (p, in) | {p.π \| p.π ∈ in} |
| aliasMatches (p, f, in) | {α.f \| α.f ∈ in ∧ alias(α, p)} |

As is customary in flow analysis, gen refers to the new must-access-paths added to the State set, and kill refers to the must-access-paths removed from the set. It should be noted again that State, here represented by a set of must-access-paths, is only one component of the data flow domain Fact. In the table of transformations, alias($\alpha$,p) checks if p may be an alias of expression $\alpha$ based on inexpensive type match.

Because State must be finite, each time the transformation of must-access-paths set is computed, the size of the resulting set should be limited using a filter function. It should be done so for two reasons: (a) in the presence of loops (or recursion) it is possible for access paths to grow indefinitely, and (b) even loop free code might inflate the sets to needlessly large sizes, compromising efficiency. filter(a: State) empties the set if either any access path in it is longer than a preset limit ("depth"), or the number of access paths in it has exceeded a preset limit ("breadth").

Given this implementation of State, the auxiliary functions mentioned above are as follows. initialState(p) produces a singleton set {p}. isMustAlias(p, q, a) checks if q is in the must-access-path set al. is Consistent(condition, a) can be resolved for (only) certain kinds of queries. If a includes v.$\pi$, where $\pi$ is a possibly empty list of fields, then it can be deduced that v cannot be null. Therefore, a condition is of the form v=null or v≠null can be decided exactly. If a includes both v and w, then it can be inferred that v=w. Finally, isUnreachable ($\alpha$, p) is true if a is empty.

Referring now to Tables 4 and 5, an illustration of how the State set is transformed in accordance with exemplary embodiments of the present invention is provided with reference to code fragment examples.

TABLE 4

| Code Fragment | Fact |
| --- | --- |
| 1. p = acquire R | $\langle p, R, \{p\}\rangle$ |
| 2. q.f = p | $\langle p, R, \{p, q.f\}\rangle$ |
| 3. r = q.f | $\langle p, R, \{r, p, q.f\}\rangle$ |
| 4. branch (r == null) L1 | T: none, F: $\langle p, R, \{r, p, q.f\}\rangle$ |
| 5. release r | none |
| 6. L1: | none |

In the first example shown in Table 4, the facts accumulated by the analysis conducted by Algorithm 1 are shown after each statement in the right column. At the branch, is Consistent checks indicate that only the fall-through successor is feasible: as r, being a must-alias to a resource, is not a null pointer. At the release, the call isMustAlias(p, r, {r,p,q.f}) succeeds. Consequently, no fact makes it to L1.

Had an imprecise and conservative is Consistent been used, then a fact $\langle p,R,\{r,p,q.f\}\rangle$ would have been obtained after L1. Since this is the exit, local variables are dropped from the state, giving the fact $\langle p, R, \{ \}\rangle$. This fact would satisfy the query is Unreachable({ }, p). Hence, an imprecise and conservative is Consistent would have resulted in a false positive. Further, if the State had been filtered at line 3 of the code fragment in Table 4 for a breadth limit of 2, it would have been decided, conservatively, that the release on r may not release the resource acquired on line 1: isMustAlias (r, p, { }) is false. Again, this would have resulted in a false positive.

Referring now to the example provided in Table 5, another code fragment is considered.

TABLE 5

| Code Fragment | Facts for first iteration | Facts for second iteration |
| --- | --- | --- |
| 1. $p_1$ = null | | |
| 2. L1 | $\langle p_3, R, \{p_3\}\rangle$ | $\langle p_3, R, \{p_2\}\rangle$ |
| 3. $p_2 = \phi(p_1, p_3)$ | $\langle p_3, R, \{p_2, p_3\}\rangle$ | $\langle p_3, R, \{ \}\rangle$ |
| 4. branch * L2 | | |
| 5. $p_3$ = acquire R | $\langle p_3, R, \{p_3\}\rangle$ | $\langle p_3, R, \{p_2\}\rangle$ |
| 6. branch true L1 | | |
| 7. L2 | $\langle p_3, R, \{p_2, p_3\}\rangle$ | $\langle p_3, R, \{ \}\rangle$ |
| 8. release $p_2$ | | $\langle p_3, R, \{ \}\rangle$ |

The code in Table 5 illustrates the treatment of $\phi$ nodes. In this example, a path taken through the loop two times and then exiting to L2 is considered. The Facts for the first iteration are shown in the left column and the Facts for the second iteration are shown in the right column. In the first iteration, the initialization generates $\langle p_3, R, \{p_3\}\rangle$ after the acquire statement. The generated fact flows to L2, where the $\phi$ generates $\langle p_3, R, \{p_2, p_3\}\rangle$, using the effect of $p_2 = p_3$. This, in turn, flows out to L2, where it is removed by the release statement.

In the second iteration in the loop body, the acquire statement kills the occurrence of $p_3$ from $\{p_2, p_3\}$, generating the fact $\langle p_3, R, \{p_2\}\rangle$. Going around the back edge again, this last fact is transformed by the $\phi$ statement to $\langle p_3, R, \{ \}\rangle$. When the transformed fact flows out to L2, it cannot be removed by release. The test isUnreachable({ }, $p_3$) passes and a leak is reported.

It should be understood that the role of State is to keep track of interesting information related to a specific resource allocation. Although an embodiment of State has been described above, alternative embodiments may be employed in accordance with the present invention. For example, the analysis described herein may be implemented using a richer State at additional run-time cost. For example, State in alternative embodiments could track even more predicates to enable more precision in call resolution or in branching. Going in the other direction, since there are conservative ways of answering the queries made on State, it is also possible to have a small and simple embodiment of it, at the expense of precision.

Further, it is possible to decouple the State from a specific Fact, and answer the auxiliary predicates based on globally computed information, i.e. information not computed specific to a given resource allocation. For example, a precise flow- and context-sensitive points-to analysis can be computed to answer the queries. However, it is difficult to scale such analyses for the types of large-sized of applications described above.

Inter-Procedural Analysis

The algorithm presented in Table 2 generalizes easily to the inter-procedural case. As is fairly standard, it can be assumed there is an inter-procedural call edge from a call statement to each of the possible callees. For example, a static call graph can indicate multiple possible callees. In addition, it can also be assumed that there is a return edge from exit of a callee to each of the call statements that could have invoked it. For example, FIG. 1 illustrates such call and return edges 108 using dotted lines. A call edge is accompanied by assignment of formal parameters to values of the corresponding actuals, and likewise, a return edge is accompanied by assignment of (any) return value to the left-hand-side (if any) of the call statement. Inter-procedural analysis over this structure can be implemented using an interprocedural, finite, distributive subset ('IFDS') framework.

As an optimization, Algorithm 1 performs the following reasoning when it encounters a call statement. First, for a fact ⟨p, R, a⟩ that reaches the call instruction, it determines whether the callee method is relevant. For example, the callee method is relevant if the fact can be either dropped due to a matching release or its State is altered in the callee, or in any of its transitive callees. The algorithm uses a very inexpensive and conservative side-effect computation to determine side effects. If the fact is relevant, it is propagated into the call. Here, formal parameters of the callee are assigned corresponding values from the actuals using the transformation for a copy statement (p=q). If the fact is not relevant, it is propagated only to the successors of the call statement, bypassing the call. This improves performance reasons, as in practice many methods are simply auxiliary in nature and it is wasteful to drag facts along the CFGs of those methods. Also, it is useful to note that any exceptions that can be thrown inside those CFGs and not caught locally are reflected in the intermediate representation ('IR') in exceptional flow edges emanating from the call instruction in the caller's CFG. Thus, soundness is not sacrificed when bypassing callees. In accordance with exemplary aspects of the present invention, relevance may be set by a user so that resources can be tracked in a customizable manner. For example, a user may specify which method calls are resource allocations and which are resource de-allocations.

It should be understood that given a sound call graph, exemplary embodiments of the present invention are sound in that they do not miss true positives. It should be noted however, that computing a sound call graph for partial programs, or in the presence of reflection, is non-trivial. Call graph construction is briefly described below. It should also be noted that exemplary embodiments described herein analyze open programs: e.g. a library without client code. In such programs, sometimes a resource 'escapes' to the unknown caller either as a return value, or as a field of some longer lived object. Such situations are not denoted as leaks, assuming optimisitically that the (missing) client would release the escaped resources. However, alternatively, a pessimistic version of the algorithm can be implemented, but the optimistic assumption has been found to be more useful. The soundness described here is modulo this assumption.

Computation of Actionable Reports

As mentioned above, other exemplary aspects of the present invention are directed to offering actionable error reports messages, rather than simply being comprehensive. Exemplary features through which actionability can be enhanced are described herein below. First, a heuristic that prioritizes reports based on the structure of access paths sets to rank likely true positives higher is described. Second, error reports that arise from leakage of the same underlying resource can be clustered for the convenience of the user. Third, error reports that arise from exception flows that a programmer typically would not be interested in can be suppressed.

Prioritization

As discussed in above, the analysis can operate by tracking sets of must-access paths to unreleased resources and reporting a leak if a tracked set becomes empty. An access path set may become empty in one of two ways: (1) every handle in the set is rooted at a local variable that is going out of scope, or (2) the size of the set, or the length of one the handles, is about to exceed a preset limit. In the first case, the generated leak report is based on a leakage witness—a path through the program's supergraph along which the given resource is not released. These are denoted as witnessed reports. In the second case, the analysis is unable to find a witness with the given limits on fact size, so the resulting leak report is denoted an assumed report.

Witnessed and assumed reports obtained by progressively relaxing the limits on the size of tracked facts have two key properties, which implementations can exploit to generate low cost, high quality results. First, for a given limit d on the length of tracked paths and a limit b on the size of tracked sets, it can be shown that witnessed reports $W_{\langle d,b \rangle}$ are significantly more likely to be true positives than the assumed reports $A_{\langle d,b \rangle}$. Therefore output is prioritized so that the reports in $W_{\langle d,b \rangle}$ are ranked higher than those in $A_{\langle d,b \rangle}$. Second, for a pair of limits $$\langle d, b \rangle \leq \langle d', b' \rangle, W_{\langle d,b \rangle} \subseteq W_{\langle d',b' \rangle} \text{ and } A_{\langle d,b \rangle} \cup W_{\langle d,b \rangle} \supseteq A_{\langle d',b' \rangle} \cup W_{\langle d',b' \rangle}.$$

That is, the analysis generates more witnessed reports and rules out more false positives when tracking richer facts, which is a straightforward consequence of the definition of a leak presented above. An empirical corollary to this is that the quality of the reports plateaus quickly, so that $W_{\langle d,b \rangle}$ captures the majority of true positives for a small d and b. As a result, a default configuration for exemplary embodiments can be d=3 and b=5, which yields nearly as high a proportion of witnessed (and, hence, highly ranked) true positives as would a slower configuration that uses larger limits.

Exception Flow

Many resource leaks found in real programs occur along exceptional paths. The program provided in Table 1, for example, may leak the file output stream if the constructor of the stream writer throws an UnsupportedEncodingException. But not all exceptional paths are interesting or likely to be exercised, and it can be shown that a leakage analysis that processes all exceptional edges would generate a large number of reports with little practical value.

To illustrate, reference is made to another exemplary program illustrated in Table 6, below.

TABLE 6

| | |
|---|---|
| 1 | public Integer getFirst(File in) throws IOException { |
| 2 |    FileInputStream fis = new FileInputStream(in); |
| 3 |    Integer ret = null; |
| 4 |    try { |
| 5 |       int val = fis.read( ); |
| 6 |       ret = new Integer (val) |
| 7 |    } catch (IOException e) { } |
| 8 |    fis.close( ); |
| 9 |    return ret; |
| 10 | } |

The program in Table 6 is, for all practical purposes, free of leaks. It closes the allocated file input stream along all normal paths, and any IOException that may be thrown by the call to read( ) is caught and ignored. Nonetheless, an analysis that processes all exceptional edges would generate a leak report for this program because fis.close( ) would not be executed if the allocation of the Integer object on line 6 failed due to an OutOfMemoryError. Such a report is not very useful, however. Most programs are not expected to recover from an OutOfMemoryError, and once the program fails, all system resources are automatically released.

The analysis described above with respect to Algorithm 1 can process exceptional edges selectively. In particular, the Algorithm can be configured so that only edges associated with relevant exception types are processed. The definition of what is relevant is customizable, but may be guided by a belief-based heuristic that considers an exception irrelevant unless there is evidence to the contrary. In exemplary implementations of the present invention, relevant exception types for a method m may include all types E such that: (1) m explicitly throws an instance of E via a throw statement; (2) m explicitly catches an instance of E in a catch block; or (3) E appears in the throws clause of /WS signature. The set of relevant exception types for a program may simply be the union of the relevant exception types for each of the methods in its call graph.

Nested Resources

It is commonplace in Java to have classes that encapsulate or wrap a resource in one of their fields. For example, in PrintWriter and OutputStreamWriter, both of which were used in the program provided in Table 1, the contract indicates that the output stream passed as argument to the constructor is closed when close( ) is called on the encapsulating instance. The following code snippet is therefore free of leaks even though fos.close( ) is not called directly:

```
FileOutputStream fos = new FileOutputStream(file);
OutputStreamWriter osw = new OutputStreamWriter(fos);
...
osw.close( );
```

Unlike leaks of system resources, wrapper leaks are often benign. If a wrapper is encapsulating a memory resource, such as a ByteArrayOutputStream, then a failure to close the wrapper is uninteresting, as it will be handled by the garbage collector. The same is true if a wrapper encapsulates a system resource that is released independently, as shown below:

```
FileOutputStream fos = new FileOutputStream(file);
OutputStreamWriter osw = new OutputStreamWriter(fos, enc);
...
fos.close( );
```

In fact, direct disposal of wrapped resources is a commonly occurring coding pattern.

Not all wrapper leaks are uninteresting. For example, if a wrapped system resource is leaking, and the handle to the resource is inaccessible, as in the program of Table 1, then the only way to actually correct the underlying leak is by releasing the wrapper. As such, leaks on wrappers which encapsulate leaking system resources may be reported. Since these reports are not independent, they may be clustered so that all wrapper leaks pertaining to the same underlying resource are in the same cluster. For example, the leaks on the FileOutputStream, OutputStreamWriter and PrintWriter resources in the program of Table 1 may form a single report cluster.

The implementation of clustering employs post-processing of the output of the standard inter-procedural algorithm. Initially, wrapper types can seed the analysis just like real resources. Once the analysis terminates, potentially leaking instances may be organized into a forest of directed acyclic graphs. The roots of these graphs represent real resources, and edges lead from wrapped to wrapper instances. An edge from p to q may be created if of must-aliases p, and f is the field that holds a wrapped object, as per the type of q (the determination of which field hold nested resources is a matter or specification). Each disconnected portion of this forest may be presented as a cluster.

Specific Exemplary Embodiments

The analysis techniques presented above can be implemented in a tool and performed in three stages. First, the tool may compute the call graph of the program to be analyzed. Because many of the standard call graph construction algorithms, such as zero-order control flow analysis (0-CFA), do not easily scale to large applications, and neither do they work well for partial programs, call graphs in accordance with exemplary embodiments of the present invention can be based directly on the program's class hierarchy, using type information to determine targets of virtual dispatches. For efficiency, the computed call graph may include only a small, but adequate, subset of the program's methods. In particular, a given method m may be included only if it includes a resource allocation instruction or it transitively calls a method that includes such an instruction. Each included method should also be reachable from a public entry point (i.e. a public method of a public class). After the tool has constructed the call graph, the tool may perform the core resource tracking analysis discussed above with respect to Algorithm 1, which may generate a set of witnessed and assumed leak reports. The final stage of the analysis may involve clustering and filtering of these reports for improved actionability.

It should be understood that the flowchart and block diagrams in the Figures discussed herein illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
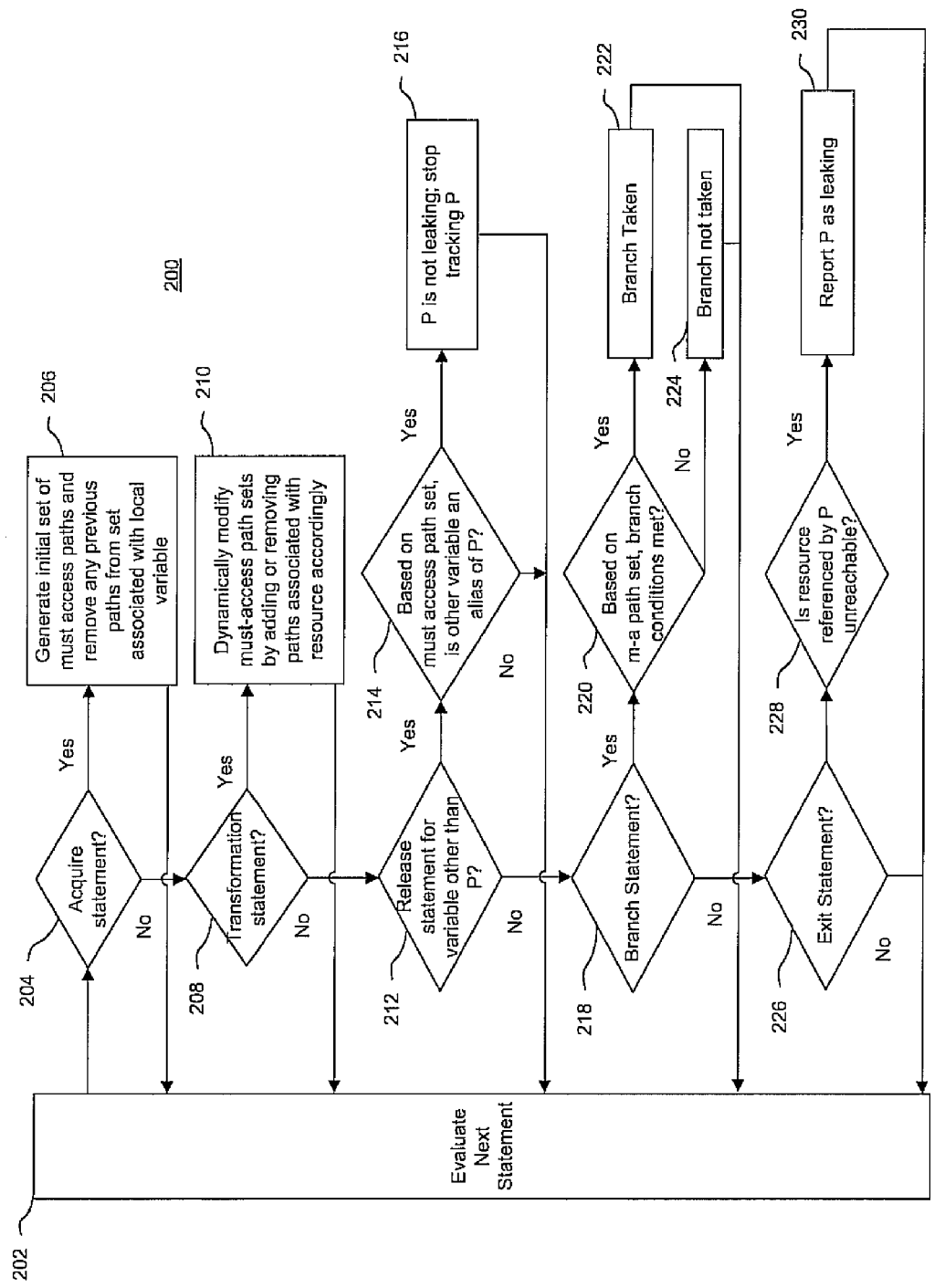
FIG. 2 is a high-level blade/flow diagram of a method for detecting resource leaks in a program in accordance with an exemplary embodiment of the present invention.

With reference now to FIG. 2 with continuing reference to Tables 2-4, a method 200 for determining resource leaks of a program in accordance with one exemplary embodiment of the present invention is illustrated. As mentioned above, it can be assumed that in exemplary embodiments of the present invention a program can be used to generate a control flow representation, such as a control flow graph. As noted above, in the control flow representation, program statements can be represented as the following kind of abstract statements: entry, exit, p=acquire R, release R q, branch c L, p=new T, p=q.f, p.f=q, p=q, and a call statement invoke.

Method 200 may begin at step 202 in which a statement of the control flow representation is evaluated. At step 204, it can be determined whether the statement evaluated, represented as a local variable p, is an acquire statement. If p is an acquire statement, then, at step 206, an initial set of must-access paths can be generated and any previous paths from the set associated with p can be removed. For example, as shown in lines 5-8 of Table 2 and in the first line of Table 4, a State a including a set of must-access paths is generated. Further, as shown in Table 3 and Table 5, an acquire statement can remove previous must-access paths associated with p. Thereafter, the method can proceed to step 202 in which the next statement can be evaluated.

At step 208, it can be determined whether the currently evaluated statement is a "transformation statement." Transformation statements are statements that can adjust the set of must-access paths associated with a local variable. For example, Table 3 illustrates a set of transformation statements that adjust the set of must access paths "in" associated with local variable p. If the currently evaluated statement is a transformation statement, then the method can proceed to step 210 in which the set of must-access paths associated with a local variable is modified by adding and/or removing paths associated with the resource referenced by the local variable. The discussion above with respect to Tables 4 and 5 illustrate how the set of must-access paths associated with a local variable, p or $p_3$, can be dynamically modified or transformed. Thereafter, the method can proceed to step 202 in which the next statement can be evaluated.

At step 212, it can it can be determined whether the currently evaluated statement is a release statement for another local variable. For example, it can be determined whether the currently evaluated statement is a release statement on a resource associated with local variable different from p. If the statement is a release statement form a different local variable, then the method can proceed to step 214, in which it can be determined whether the other variable is an alias of p based on the must-access path set. For example, as discussed above with respect to lines 12-14 of Table 2 and line 5 of Table 4, the must-access path set can be used to determine whether q or q.f associated with a resource R or r, for which a release statement is made, is an alias of p. If the other variable is an alias of the local variable p, then p is determined to be not leaking and tracking of p can cease at step 216. Thereafter, the method can proceed to step 202 in which the next statement in the control flow representation can be evaluated. If the other variable is not an alias of p, then the method can proceed to step 202 to evaluate the next statement or must-access paths of other local variables can be evaluated. For example, continuing with step 214, it can be determined whether the release statement releases resources of any local variable for which a set of must-access paths has been generated.

At step 218, it can be determined whether the currently evaluated statement is a branch statement. If the currently evaluated is a branch statement, then the method can proceed to step 220 in which it is determined whether branch conditions are met based on one or more sets of must-access paths. For example, as discussed above with respect to lines 15-19 of Table 2 and line 4 of Table 4, a set of must access paths, a, can be employed to determine whether branch conditions, c, have been satisfied. As noted above, this determination can be made to prune infeasible paths. It should be understood that any set of must-access paths for any local variable can be used to determine whether a branch is taken. If the branch conditions are met, then the branch is taken at step 222 and the corresponding branch target is evaluated at step 202. If the conditions are not met, then the branch is not taken at step 224 and the next sequential program statement is evaluated at step 202. It should be noted that, perhaps with the exception of certain exceptional paths, discussed in more detail below, all feasible paths should be evaluated.

At step 226, it is determined whether the currently evaluated statement is an exit statement. If the currently evaluated statement is an exit statement, then, at step 228, it is determined whether the resource referenced by a local variable is unreachable. For example, as discussed above with respect to lines 20-22 of Table 2 and line 8 of Table 5, in response to reaching an exit statement, it is determined whether a resource referenced by local variable p or $p_3$ is unreachable by examining the corresponding set of must-access paths. If it is determined that the local variable is unreachable, then it is reported as leaking. As noted above, an empty must-access path set can indicate that the resource is leaking. Thereafter, the method may proceed to step 202 in which the next statement, if any, is evaluated. Here, the next statement after an exit is encountered may correspond to a different procedure in the program. However, it should be understood that calls to other procedures can be made and evaluated prior to an exit of the procedure. Further, because variables local to the other called procedures can reference a common resource with the caller procedure, the common resource can be tracked by dynamically modifying must-access paths accordingly, as discussed above.

Returning to step 204, it should be understood that the method can manage the evaluation of many local variables. Thus, if at step 204, the currently evaluated statement is not an acquire statement, then the method may proceed to steps 208, 212, 218 and 226, as shown, to make evaluations with respect to any local variable for which must-access paths have been generated. However, for simplicity purposes, to ease understanding of exemplary aspects of the present invention, the method has been described above primarily with respect to evaluations associated with the variable p. Thus, each of the decision steps in method 200 can be performed for any local variable and many different variables can be evaluated simultaneously or intermittently.

Figure 3:
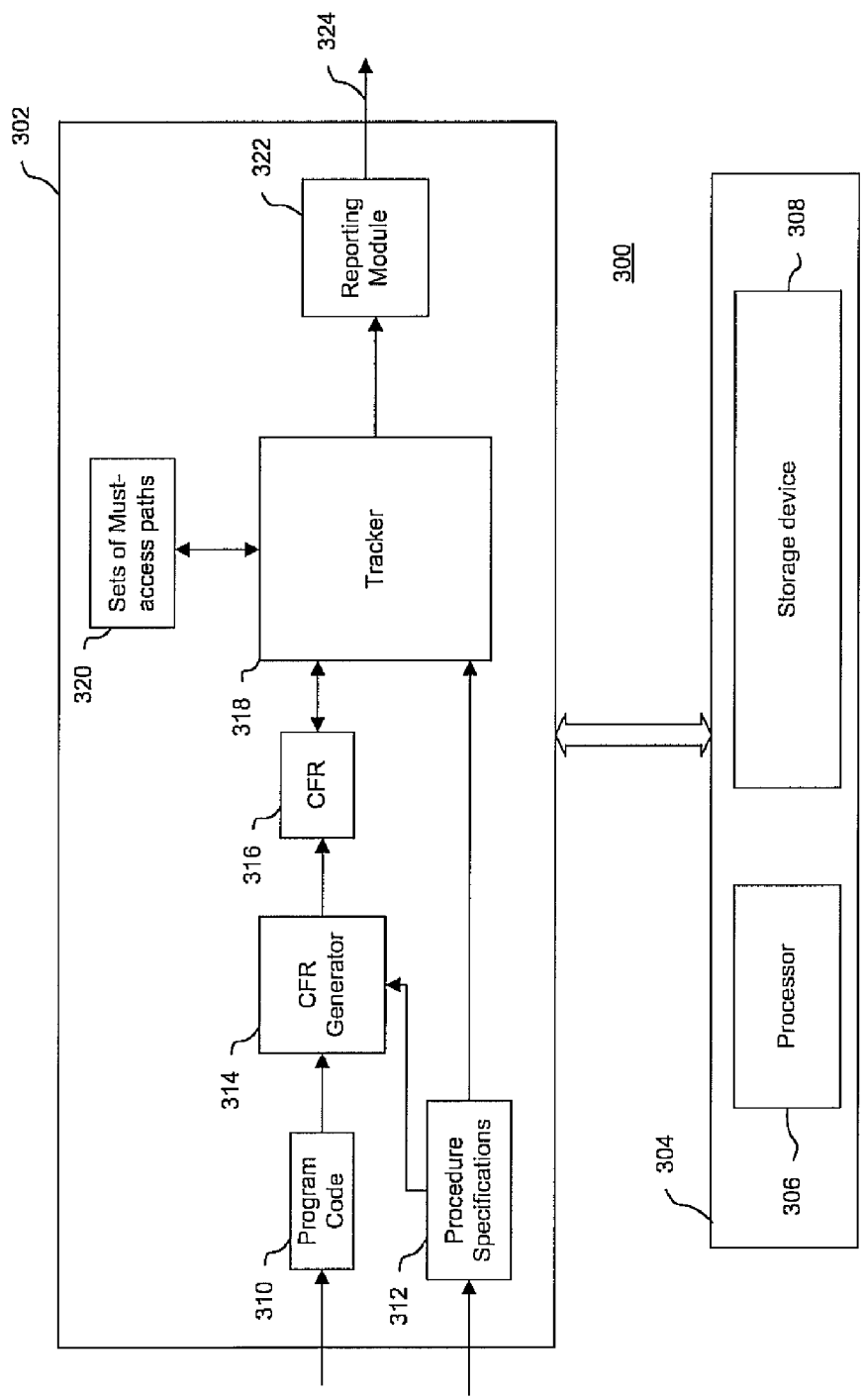
FIG. 3 is a high-level block/flow diagram of a system for detecting and reporting resource leaks in accordance with an exemplary embodiment of the present invention.

With reference now to FIG. 3, a system 300 for detecting and reporting resource leaks in a program in accordance with one exemplary embodiment of the present invention is illustrated. System 300 can be implemented in software within an application 302 and an underlying hardware platform 304, as indicated in FIG. 3, which can include a processor 306 and a storage device 308. However, it should be noted that application 302 may alternatively be implemented in only hardware elements, as understood by those of ordinary skill in the art. Thus, it should be understood that the phrase "implemented on a processor and storage medium" or "implemented on a processor and a program storage device" should be understood to encompass embodiments including software implemented on hardware elements and hardware embodiments as well. Further, it should also be understood that the elements within application 302 may also be implemented on a computer readable storage medium comprising a computer readable program embodying a program of instructions for one or more methods disclosed herein. Here, the instructions are executable by a computer and may comprise one or more or all of the steps of the methods described herein. In addition, the computer readable program, when executed on a computer, can cause the computer to perform the instructions or method steps.

Application 302 of system 300 can include program code 310 and procedure specifications 312, which can be provided to the application by the user. As noted above, the input can be a specification of procedures that acquire and release system resources. Application 302 can further include a control flow representation ('CFR') generator 314 which can be configured to employ the program code and the procedure specifications to generate a control flow representation, such as a control flow graph. For example, the CFR generator can rewrite program code into the set of abstract statements discussed above. Application 302 can also include a tracker 318, which can be configured to generate and employ sets of must-access paths 320 to evaluate the CFR and perform intraand inter-procedural analysis in accordance with the descriptions provided above. Thus, the tracker 318 can provide resource leak information to a reporting module 322, which can, in turn, generate and output resource leaks reports 324. The reporting module 322 can prioritize, filter and cluster resource leaks in accordance with the teachings provided above concerning actionable reports.

Figure 4:
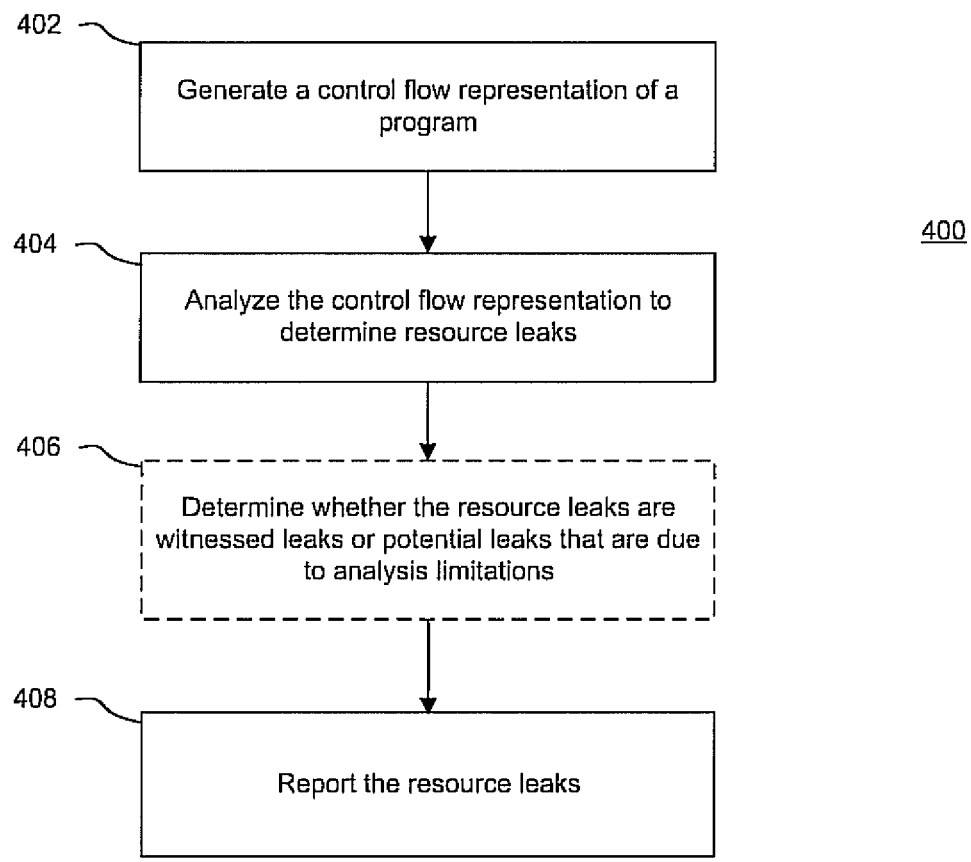
FIG. 4 is a high-level block/flow diagram of a method for detecting and reporting resource leaks in accordance with an exemplary embodiment of the present invention.

Referring now to FIG. 4, with continuing reference to FIGS. 2 and 3 and Tables 2-5, a method 400 for detecting and reporting resource leaks in accordance with one exemplary embodiment of the present invention is illustrated. In certain exemplary embodiments, method 400 can be implemented by system 300. Method 400 can begin at step 402 in which the CFR generator 314 can generate a CFR 316 of the program code 310, as discussed above.

Figure 5:
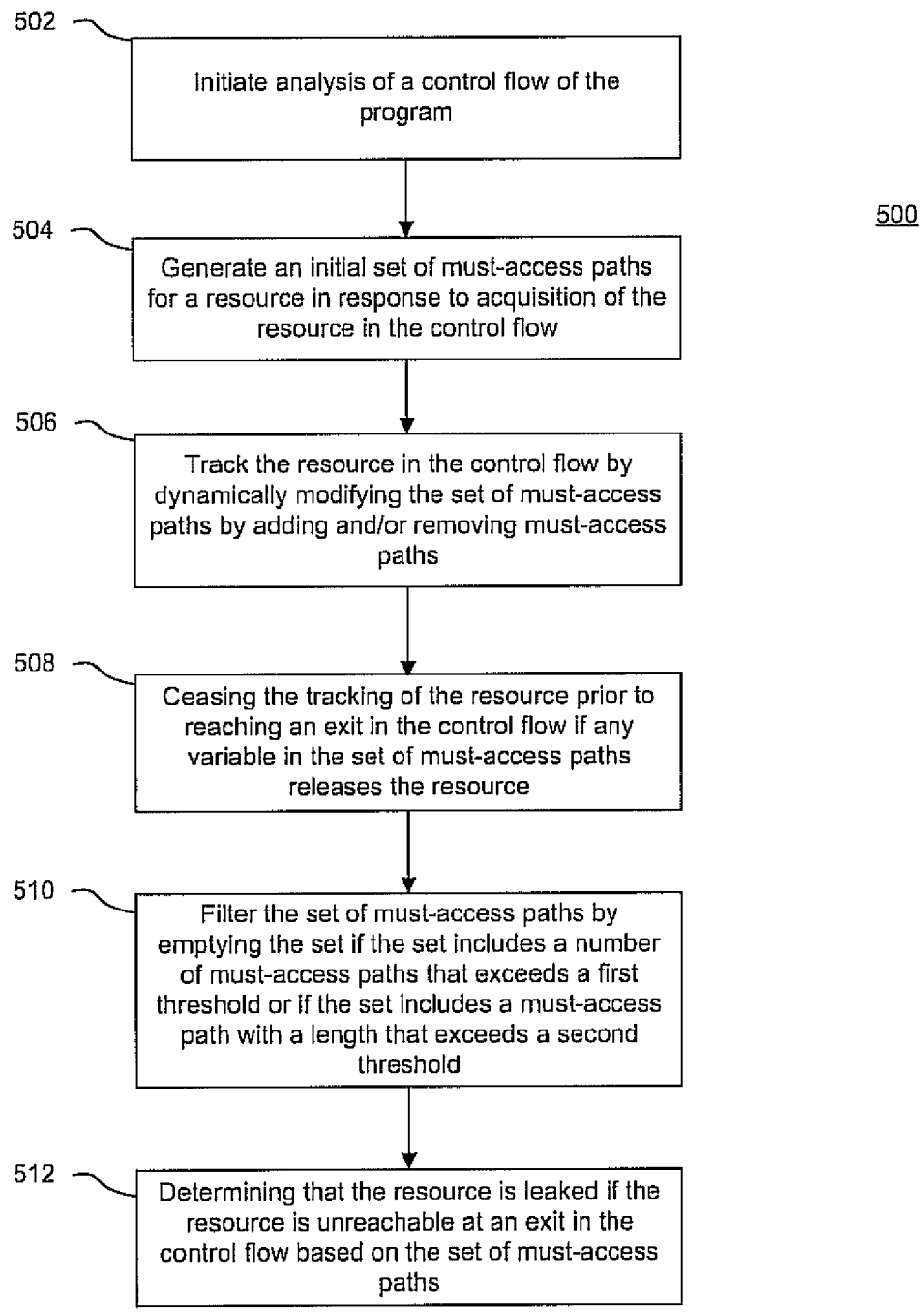
FIG. 5 is a high-level block/flow diagram of a method for detecting resource leaks in accordance with an exemplary embodiment of the present invention.

At step 404, the tracker 318 can analyze the control flow representation to determine resource leaks, as discussed above. For example, the tracker 318 may perform method 200 discussed above. Further, with reference to FIG. 5, with continuing reference to FIGS. 2-4 and Tables 2-5, the tracker 318 can be configured to perform a method 500 for detecting resource leaks in accordance with another exemplary embodiment of the present invention. Method 500 can begin at step 502 in which the tracker initiates an analysis of the control flow of the program.

At step 504, the tracker 318 can generate an initial set of must-access paths for a resource in response to acquisition of the resource in the control flow. For example, as discussed above with respect to steps 204 and 206 of method 200 and steps lines 1-8 of Table 2, the tracker 318 can generate a 3-tuple fact including a set of must-access paths for a local variable corresponding to an acquire statement for a resource.

At step 506, the tracker 318 can track the resource in the control flow by dynamically modifying the set of must-access paths by adding and/or removing must-access paths in accordance with the control flow analysis. For example, as discussed above with respect to steps 208 and 210 of method 200 and Tables 2-5, the set of must-access paths can be dynamically adjusted in accordance with any transformation statements encountered, such as those listed in Table 2. Further, as discussed above, the tracking can be continued through inter-procedural calls, Moreover, as discussed above, if a call is not "relevant," due, for example, to a determination that the callee does not include a matching release, or the callee, or any of its transitive callees, does not alter the State, then the call can be bypassed. For example, when a irrelevant call is reached, the evaluation for the corresponding fact can bypass callee procedure. Thus, in this way, for example, the resource may be tracked through an inter-procedural call only if the inter-procedural call results in an alteration in the set of must-access paths or if the inter-procedural call results in a release of the resource. Otherwise, if the call is relevant, for example, then the fact can be propagated through the callee procedure and the set of must-access paths in State can be adjusted by adding and/or removing must-access paths, or the resource can be released, in accordance with analysis of the statements of the callee procedure.

Other features of the tracking step can include determining whether a branch is taken by assessing whether conditions for a taken branch are true based on the set of must-access paths, as discussed above. For example, as described above with respect to steps 218-224 of method 200, lines 15-19 of Table 2 and line 4 of Table 4, a set of must access paths, a, can be employed to determine whether branch conditions, c, have been satisfied. If the conditions are satisfied, the tracker may evaluate the taken branch, otherwise, the branch can be deemed infeasable if the conditions for taking the branch are inconsistent with one or more sets of must-access paths. In addition, irrelevant exception types, such as an out-of-memory-exception, from which most programs are not expected to recover, can be filtered during the analysis of the control flow as opposed to filtering out such exceptions during reporting, which was described above. Thus, for example, the tracker 318 can be configured to ignore such irrelevant exceptions when evaluating a program by treating them as "infeasible" paths. Such exceptions can be of a pre-determined type and preset by a user prior to initiating the analysis of the control flow of the program.

At step 508, the tracker 318 can be configured to cease tracking of the resource prior to reaching an exit in the control flow if any variable in the set of must-access paths releases the resource. For example, as discussed above with respect to steps 212-216 of method 200, lines 12-14 of Table 1 and line 5 of Table 4, if a release statement is reached, the analyzer, or in this case, the tracker, can determine whether the variable referencing the released resource is an alias of the variable p or $p_3$ using the set-of must access paths. As such, if the variable referencing the released resource is an alias of the variable p or $p_3$, then the resource referenced by p or $p_3$ has been released and the tracker can cease tracking the resource. However, it should be noted that tracking of the resource may be re-initiated throughout the evaluation if the resource is reacquired or acquired by, for example, another local variable.

At step 510, the tracker 318 can filter the set of must-access paths by emptying the set if the set includes a number of must-access paths that exceeds a first threshold or if the set includes a must-access path with a length that exceeds a second threshold. For example, as discussed above with respect to the filter function applied to State, a set of must-access paths can be emptied for efficiency purposes if either the number of access paths in the set has exceeded a preset limit, which can correspond to the first threshold, or any access path in the set is longer than another preset limit, which can correspond to the second threshold.

At step 512, the tracker 318 can determine that the resource is leaked if the resource is unreachable at an exit in the control flow based on the set of must-access paths. For example, as discussed above with respect to steps 226-230 of method 200, lines 20->of Table 2 and line 8 of Table 5, a resource can be determined to be leaked if the set of must-access paths is empty.

Thus, using method 500, the tracker 310 can provide resource leak information to the reporting module 322. As noted above with respect to method 200, method 500 can be applied to several different local variables simultaneously. With reference again to FIG. 4, the reporting module can, in turn, generate an actionable report at step 408 by employing one or more of the prioritization, filtering or nesting features discussed above.

For example, optionally at step 406, the reporting module 322 can determine whether the resource leaks are witnessed leaks or potential leaks that are due to analysis limitations, as discussed above. For example, leaks are determined to be witnessed leaks when they are due to the unreachability of a resource, as discussed above for example with respect to exit statements. Potential leaks that are due to analysis limitations can correspond to potential leaks associated with a set of must-access paths that has been emptied as a result of either a must-access path exceeding a preset length limit or the total number of must-access paths exceeding a preset limit. As discussed above, the report can be configured so that witnessed leaks are prioritized over potential leaks that are due to analysis limitations.

In addition, the reporting module 322 can be configured to determine whether any of the leaks are leaks of nested resources at step 406. As discussed above, it may be more useful for a programmer to be aware of a wrapper in which a resource leak is nested to remedy the leak. Thus, the reporting module 322 at step 408 can report at least one wrapper of a nested resource leak and can cluster wrappers in which the resource leaks are nested. Further, the reporting module 322 can also be configured to filter out leaks that arise from exceptional paths that of a pre-determined type, such as out-of-memory exceptions, as discussed above.

Accordingly, exemplary embodiments of the present invention can be employed to efficiently detect resource leaks in programs. In particular, the embodiments discussed herein can generate precise aliasing information on-the-fly while analyzing the program, as opposed to pre-generating all aliasing information or using imprecise methods. Furthermore, resources can be efficiently tracked in that they are tracked until the resource is released or it is determined to be unreachable, as opposed to tracking the resource throughout the entire length of the program.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims, Having thus described aspects of the invention, with the details and particularity required by the patent laws, what is claimed and desired protected by Letters Patent is set forth in the appended claims.

What is claimed is:

1. A method for detecting resource leaks in a program comprising:
    initiating analysis of a control flow of the program;
    generating an initial set of must-access paths for a resource in response to acquisition of the resource in the control flow;
    tracking the resource in the control flow by dynamically modifying the set of must-access paths by, at least one of, adding or removing must-access paths in accordance with the control flow analysis;
    ceasing the tracking of the resource prior to reaching an exit in the control flow in response to determining that any variable in the set of must-access paths releases the resource; and
    determining that the resource is leaked if the resource is unreachable at the exit in the control flow based on the set of must-access paths.

2. The method of claim 1, wherein the tracking includes tracking the resource through inter-procedural calls.

3. The method of claim 2, wherein the resource is tracked through an inter-procedural call only if the inter-procedural call results in an alteration in the set of must-access paths or if the inter-procedural call results in a release of the resource.

4. The method of claim 3, wherein the modifying further comprises adding a must-access path for a variable used in the inter-procedural call.

5. The method of claim 1, wherein the resource is unreachable if the set of must-access paths is empty.

6. The method of claim 1, wherein the tracking further comprises determining whether a branch is taken by assessing whether conditions for a taken branch are true based on the set of must-access paths.

7. The method of claim 1, further comprising:
    filtering the set of must-access paths by emptying the set if the set includes a number of must-access paths that exceeds a first threshold or if the set includes a must-access path with a length that exceeds a second threshold.

8. The method of claim 1, wherein the tracking ignores exceptional paths that are of a pre-determined type.

9. A system for detecting resource leaks in a program comprising:
    a control flow representation generator configured to generate a control flow representation of the program;
    a must-access path module configured to store a plurality of sets of must-access paths;
    a tracker, implemented by at least one hardware processor, configured to perform a control flow analysis on the control flow and track a resource by generating and modifying the sets of must-access paths such that a given set of must-access paths for a resource is generated in response to acquisition of the resource in the control flow and such that the given set of must-access paths are dynamically modified by, at least one of, adding or removing must-access paths in accordance with the control flow analysis to track the resource, wherein the tracker is further configured to track the resource through inter-procedural calls; and
    a reporting module configured to report the resource as leaked if the resource is determined to be unreachable at an exit in the control flow based on the set of must-access paths.

10. The system of claim 9, wherein the tracker is further configured to cease the tracking of the resource prior to reaching the exit in the control flow in response to determining that any variable in the given set of must-access paths releases the resource.

11. The system of claim 9, wherein the resource is tracked through an inter-procedural call only if the inter-procedural call results in an alteration in the set of must-access paths or if the inter-procedural call results in a release of the resource.

12. The system of claim 11, wherein the modifying further comprises adding a must-access path for a variable used in the inter-procedural call.

13. The system of claim 9, wherein the resource is unreachable if the given set of must-access paths is empty.

14. The system of claim 9, wherein the tracker is further configured to determine whether a branch is taken by assessing whether conditions for a taken branch are true based on the given set of must-access paths.

15. The system of claim 9, wherein the tracker is further configured to filter the given set of must-access paths by emptying the given set if the given set includes a number of must-access paths that exceeds a first threshold or if the set includes a must-access path with a length that exceeds a second threshold.

16. The system of claim 9, wherein the tracker is further configured to ignore exceptional paths that are of a pre-determined type during the analysis.

17. A method for detecting resource leaks in a program comprising:
    initiating analysis of a control flow of the program;
    generating an initial set of must-access paths for a resource in response to acquisition of the resource in the control flow;
    tracking the resource in the control flow by dynamically modifying the set of must-access paths by, at least one of, adding or removing must-access paths in accordance with the control flow analysis, wherein the tracking further comprises determining whether a branch is taken by assessing whether conditions for a taken branch are true based on the set of must-access paths; and determining that the resource is leaked if the resource is unreachable at an exit in the control flow based on the set of must-access paths.

* * * * *